United States Patent

Dufresne

[11] Patent Number: 5,495,750
[45] Date of Patent: Mar. 5, 1996

[54] HYDROSTATIC DRAIN TESTING MACHINE

[76] Inventor: Andrew K. Dufresne, P.O. Box 3310, Richmond, Nelson, New Zealand

[21] Appl. No.: 762,877

[22] Filed: Sep. 19, 1991

[30] Foreign Application Priority Data

Sep. 21, 1990 [NZ] New Zealand ............... 235422

[51] Int. Cl.$^6$ .................................................. G01M 3/08
[52] U.S. Cl. .......................... 73/49.1; 73/40.5 R
[58] Field of Search .................... 73/49.1, 49.5, 73/40.5 R, 46, 49.8, 299; 138/90, 93, 94

[56] References Cited

U.S. PATENT DOCUMENTS

| Re. 33,160 | 2/1990 | Guthrie et al. | 73/40.5 R |
|---|---|---|---|
| 2,664,750 | 1/1954 | McCrink | 73/299 |
| 3,538,746 | 11/1970 | Jacobs et al. | 73/299 |
| 3,566,675 | 3/1971 | Ledebur | 73/49.5 |
| 3,750,711 | 8/1973 | Conklin et al. | 73/40.5 R |
| 4,081,990 | 4/1978 | Chatagnier | 73/40.5 R |
| 4,116,044 | 9/1978 | Garrett | 73/40.5 R |
| 4,631,953 | 12/1986 | Chausse | 73/49.5 |
| 4,848,406 | 7/1989 | Stauner et al. | 138/93 |

FOREIGN PATENT DOCUMENTS

| 500128 | 6/1930 | Germany | 73/46 |
|---|---|---|---|

OTHER PUBLICATIONS

The National Association of Sewer Service Companies (NASSCO), *Recommended Specifications for Sewer Collection System Rehabilitation*, Section 6, pp. 17–21, (Sep. 1990).

Primary Examiner—Hezron E. Williams
Assistant Examiner—Nashmiya Ashraf
Attorney, Agent, or Firm—Christensen O'Connor Johnson & Kindness

[57] ABSTRACT

The invention is an apparatus for detecting leaks in pipe systems. The apparatus has an elongate body to which are attached two pairs of inflatable seals; one pair adjacent one end and the other pair adjacent the opposite end of the body. A testing zone is defined between the pairs of seals. The seals of each pair are spaced one from the other along the length of the body and, when inflated, are capable of sealingly engaging the inner walls of a pipe to be tested. The apparatus also has an air supply to inflate the seals; a water supply to supply water to the testing zone; a pressure sensor between the seals of each pair to detect incomplete sealing between the seals, when they are inflated, and the inner walls of the pipe; and a pressure sensor within the testing zone to detect changes in water level in the testing zone.

13 Claims, 2 Drawing Sheets

HYDROSTATIC DRAIN TESTING MACHINE

FIELD OF THE INVENTION

This invention relates to an apparatus that is suitable for use in the hydrostatic testing of pipe systems; for example drainage pipe systems. The apparatus can be used to test for leaks in drainage lines, lateral pipes, unused junctions and the like.

BACKGROUND TO THE INVENTION

Conventional draining systems usually comprise a main pipe for each street or neighbourhood from which a large number of lateral pipes project. The lateral pipes service individual properties or groups of properties. The main pipe usually has a minimum inner diameter of the order of 6" or 150 mm and is fairly straight and readily accessible. Access to the main pipe is usually provided through manholes and the like in the street. The lateral pipes on the other hand are usually small (an inner diameter of the order of 4" or 100 mm), quite often have bends in them, quite often extend at angles to the horizontal, and are usually not accessible for testing without excavation. It is therefore very difficult to test for leaks in lateral pipes or in fact to test if they are in use or not. Moreover, in some drainage systems, difficulties arise in testing for leaks in the main pipe.

One apparatus for testing drainage systems that is known to the inventor is in use in the Auckland region in New Zealand. This apparatus comprises an elongate member that has an inflatable seal adjacent each end. In use this apparatus is dragged down the main pipe until it reaches the lateral pipe to be tested. The apparatus is then manipulated so that one seal is positioned on one side of the lateral pipe and the other seal is positioned on the other side of the lateral pipe. The seals are then inflated so that they tightly engage the inner diameter of the main pipe. In this way the entrance to the lateral pipe is sealed off. Water is then poured down the lateral pipe from some suitable access point. The amount of water poured down the lateral pipe is then monitored. If there is a leak in the lateral pipe, water must be added continually to keep the lateral pipe full. The fact that water needs to be added indicates that there is a leak and the amount of water added gives some indication of the size of the leak.

This apparatus goes some way towards solving the problem of detecting leaks in lateral pipes but has a number of problems. First it can only be used to test leaks in lateral pipes and only those for which some external access point is available. Hence inaccessible joints and faults cannot be tested. Secondly there is no guarantee that the leak is not caused by the inflatable seal not sealing properly against the inner diameter of the main pipe. Quite frequently debris and the like occurs in drainage systems and this can interfere witch the seal between the inflated seal and the inner diameter of the main pipe. Thirdly the apparatus cannot be readily automated. Fourthly, if the level of the access point to the lateral pipe is more than about 6 meters above the level of the main pipe, it cannot be filled with water because the hydrostatic pressure at the main pipe would exceed the maximum generally allowed in the relevant standard specifications.

SUMMARY OF THE INVENTION

Accordingly it is an object of this invention to provide an apparatus that is suitable for detecting leaks in drainage systems that goes some way towards solving the problems of the known apparatus described above.

Accordingly this invention provides an apparatus suitable for detecting leaks in pipe systems, the apparatus comprising an elongate body; a first pair of inflatable seals adjacent one end of the body and a second pair of inflatable seals adjacent the opposite end of the body to define a testing zone between the first and second pairs of seals, the seals of each pair being spaced one from the other along the length of the body and the seals when inflated being capable of sealingly engaging the inner walls of a pipe to be tested; inflation means to inflate the seals; liquid supply means to supply a liquid to the testing zone; sealing leak detection means between the seals of each pair to detect incomplete sealing between the seals when inflated and the inner walls of the pipe; and a level sensing means within the testing zone to detect changes in liquid level in the testing zone.

Preferably the sealing detection means comprises a pressure sensing means to sense the pressure between the seals. Similarly, the level sensing means preferably comprises a pressure sensing means to sense the pressure in the testing zone.

In use the apparatus is pulled through a pipe to be tested until the testing zone straddles the portion of the pipe to be tested. The inflation means is then activated to inflate the inflatable seals so that the first pair of seals engages the inner walls of the pipe on one side of the section to be tested and the second pair engages the inner walls of the pipe on the other side of the section to be tested. If the inflatable seals sealingly engage the inner walls of the pipe, the pressure in the section between the seals of each pair increases. This is caused by the seals increasing in size and compressing any air trapped between them and the inner walls of the pipe. On the other hand, if the seals do not sealingly engage the inner walls of the pipe, the pressure will not rise. Therefore monitoring the pressure sensing means will give an indication of whether or not the seals are sealingly engaging the inner walls of the pipe.

The liquid supply means is then activated and liquid is transported into the testing zone until the section of the pipe to be tested is filled with liquid to the desired level. At this point, if there are no leaks, no further liquid will be required. If there are leaks, more liquid will be required and the amount of liquid required will give some indication of the size of the leak.

Preferably the pressure sensing means is capable of providing an electrical signal that can be converted to a digital or analogue reading. Preferably the pressure sensing means is a pressure transducer.

Preferably the liquid supply means includes a flow meter that provides an electrical signal that can be converted to a digital or analogue reading.

The apparatus may also comprise a microprocessor that has storage and computing means. Also the microprocessor may be connected to display means and instruction input means.

The apparatus is used in conjunction with a closed circuit television camera. The camera is used to ensure that the apparatus is positioned correctly over the section of the pipe to be tested.

The apparatus and the closed circuit television camera preferably may be connected to winch systems so that the apparatus and the camera can be readily positioned in the pipe.

The apparatus provides the advantage that the testing liquid can be introduced into the pipe system through the apparatus and therefore that other access points are not required. Also, the false detection of leaks due to the apparatus not sealing against the pipe can be avoided or at least detected.

The invention also provides a method for detecting the presence of a leak in a pipe system, the method comprising:

(a) positioning an apparatus according to the invention in a section of the pipe system to be tested;

(b) inflating the seals of the apparatus;

(c) monitoring the sealing leak detection means and, if a leak is detected, repositioning the apparatus in the pipe system and/or cleaning the section of the pipe system and repeating the process from step (a);

(d) supplying liquid to the testing zone through the apparatus until the section to be tested is filled; and (e) determining whether or not a leak in the testing zone is present by monitoring whether or not liquid must be supplied to keep the section full.

BRIEF DESCRIPTION OF THE DRAWINGS

An embodiment of the invention is now described, by way of example only, with reference to the drawings in which.

DETAILED DESCRIPTION OF THE INVENTION

Figure 1:
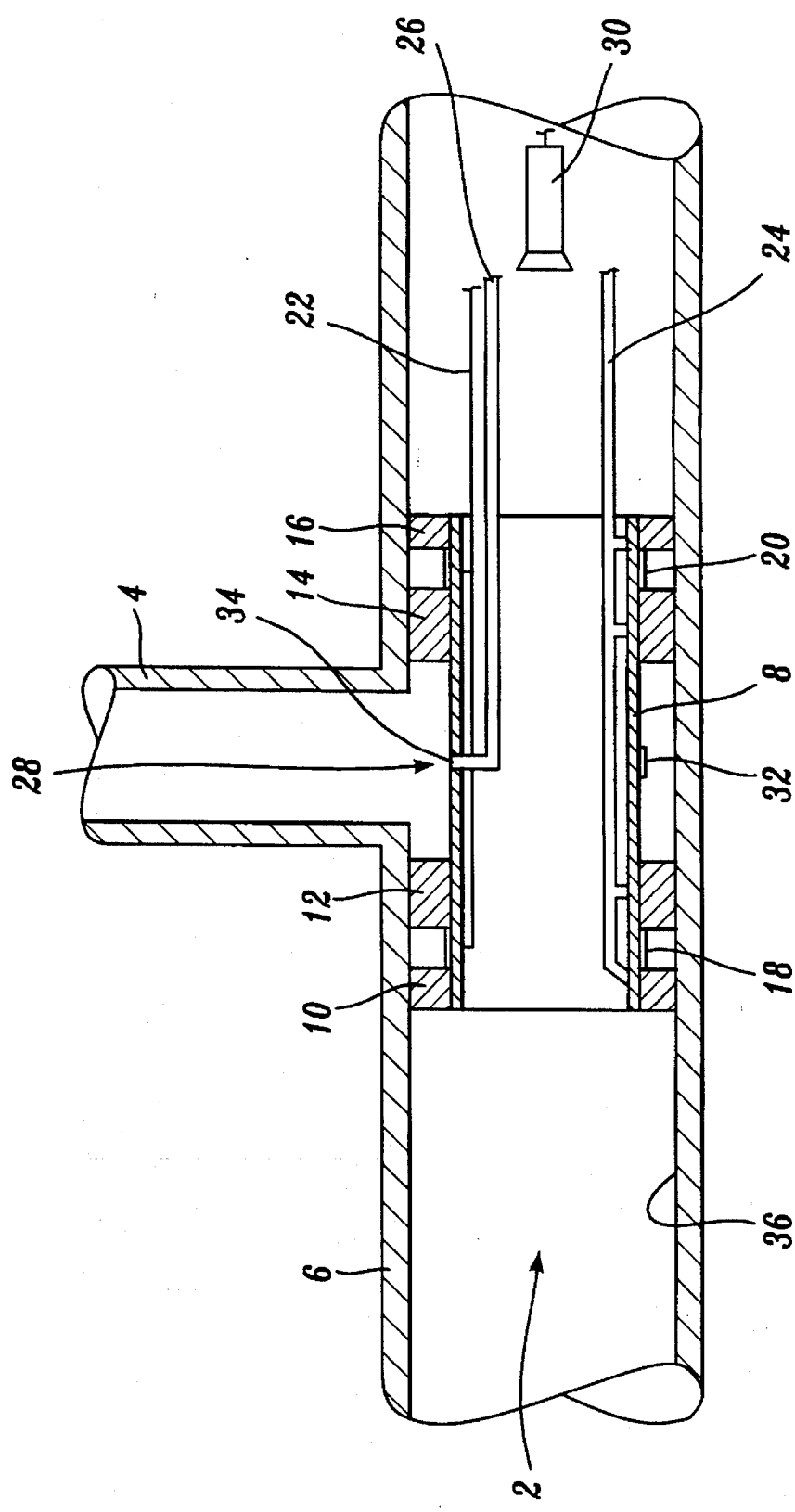
FIG. 1 is a top cross sectional view of the apparatus straddling a lateral pipe.
Figure 2:
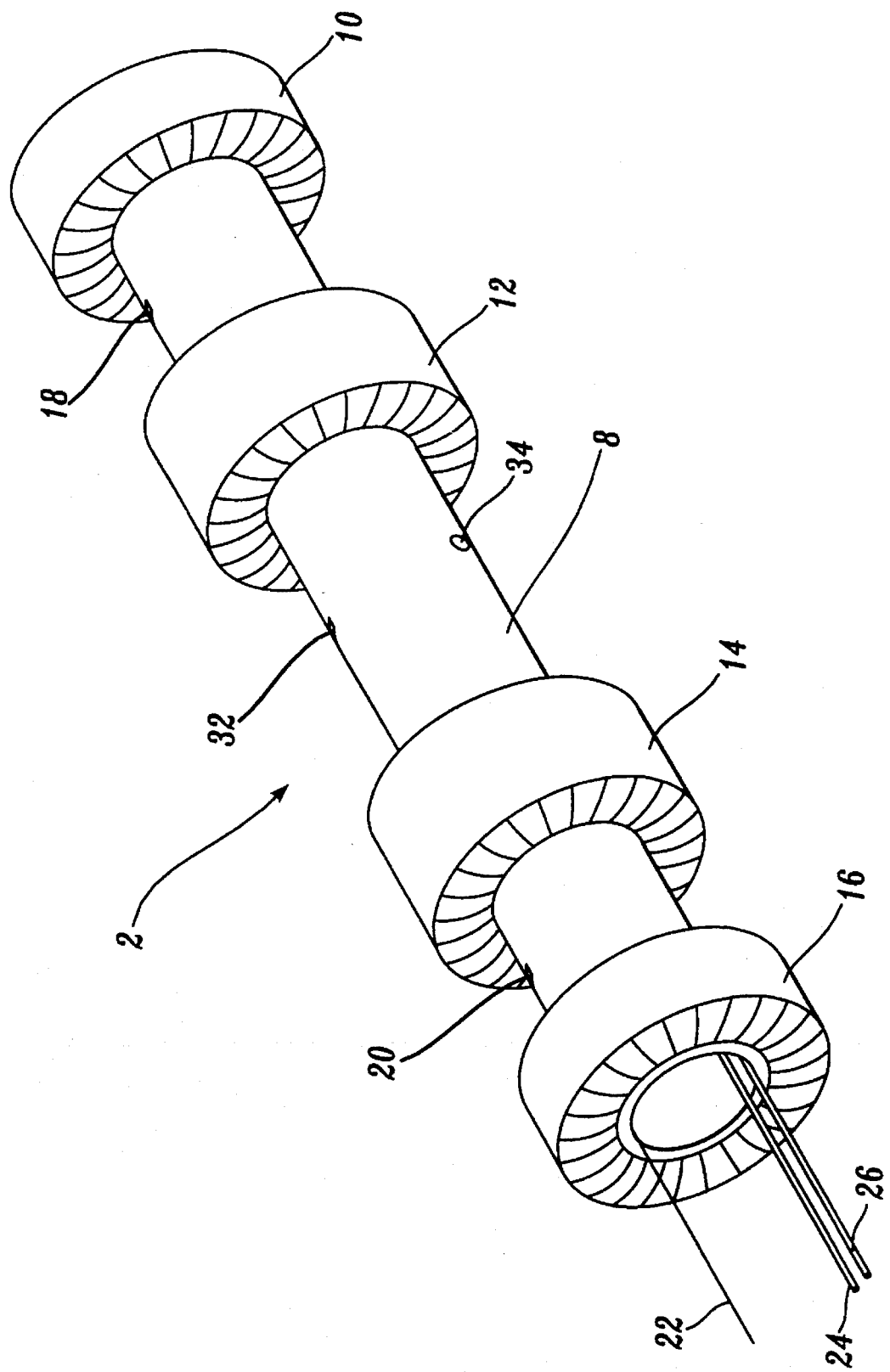
FIG. 2 is a perspective view of the apparatus.

FIG. 1 illustrates the apparatus 2 in position to test for leaks in a lateral pipe 4 of a main pipe 6. The apparatus 2 comprises a tubular housing 8 that has four inflatable seals 10, 12, 14 and 16 about it. A first seal 10 is positioned adjacent to one end of the tubular housing 8 with a second seal 12 spaced a short distance inwardly along the length of the housing 8 from the first seal 10. A third seal 16 is positioned at the opposite end of the housing 8 with a fourth seal 14 spaced a short distance inwardly along the length of the housing 8 from the third seal 16.

A pressure transducer 18 is positioned between the first seal 10 and the second seal 12 and a pressure transducer 20 is positioned between the third seal 16 and the fourth seal 14. The pressure transducers 18 and 20 are electrically connected by a cable 22 to a micro-computer or micro-processor (not shown). An air supply pipe 24 extends from a compressor (not shown) into the housing 8 and feeds each of the seals 10, 12, 14 and 16. A water supply pipe 26 extends from a source of pressurized water (not shown) into the housing 8 and exits at outlet 34 into a testing zone 28 between the second seal 12 and the fourth seal 14. The water supply pipe 26 has a flow meter (not shown) connected in it to determine the rate or quantity of water supplied to the apparatus 2. The flow meter is connected to the micro-computer or microprocessor so that the rate or quantity can be recorded and displayed.

The tubular body 8 is provided with a third pressure transducer 32 in the testing zone 28 between the second seal 12 and the fourth seal 14. This transducer 32 is used to determine the pressure in the testing zone 28 and this will give an indication of when the testing zone 28 has filled to the desired level. The transducer 32 may be connected to a suitable microprocessor which is programmed to control the value regulating the supply of liquid to the testing zone 28. In this way a predetermined and pre-set static head of liquid can be maintained in the testing zone 28.

The apparatus 2 is used in conjunction with a closed circuit television camera 30. The camera 30 is used to assist in positioning the apparatus 2 over the section of the pipe 6 that is to be tested. Although unnecessary another closed circuit television camera (not shown) can be positioned on the opposite side of the body 8 to further assisting positioning the apparatus 2.

The apparatus 2 may be connected at each end to a suitable winch mechanism (not shown) so that the apparatus 2 may be winched to and fro between two access points to the main pipe 6. The closed circuit television camera also may be connected to winch mechanisms so that it is moved in conjunction with the apparatus 2. Plainly the closed circuit television camera may be provided with a suitable carriage that facilitates transport of the camera along the pipe 6.

The tubular body 8 may be a section of pipe of appropriate diameter. The tubular body 8 may be manufactured of metals such as steel and stainless steel or suitably strong plastics. The seals 10, 12, 14 and 16 may be manufactured from rubbers and resilient plastics and may be securely attached to the tubular body 8 by means of steel bands (not shown).

In use the apparatus 2 is dragged along the main pipe 6 until the testing zone 28 straddles the section of the main pipe 6 to be tested. In the example illustrated in FIG. 1, the testing zone 28 straddles the inlet of a lateral pipe 4. In this position the second seal 12 and the fourth seal 14 are positioned one on either side of the lateral pipe 4. The closed circuit television camera 30 is used to correctly position the apparatus 2. The compressor is then activated to pump air through the air supply pipe 24 and to the seals 10, 12, 14 and 16 to inflate the seals. As the seals 10, 12, 14 and 16 inflate, they begin to engage the inner walls 36 of the main pipe 6. This causes the seals 10, 12, 14 and 16 to expand laterally as well as more tightly engage the inner walls 36 of the main pipe 6. This sideways expansion of the seals 10, 12, 14 and 16 results in compression of the air between the first seal 10 and the second seal 12 and between the third seal 16 and the fourth seal 14.

This compression of the air translates into an increased pressure which is detected by the pressure transducers 18 and 20 and a suitable signal is sent along cable 22 to the micro-computer or micro-processor. The signal indicates that the seals 10, 12, 14 and 16 have properly sealed against the inner walls 36 of the main pipe 6. Plainly the microcomputer or micro-processor has some display or warning device (not shown) that can display the pressure or warn that the required rise was not obtained. Also continued monitoring of the pressure will detect if any leakage occurs over time. If seals 10, 12, 14 and 16 do not seal properly, there will be no increase in the pressure or any initial increase will rapidly dissipate.

Once the seals 10, 12, 14 and 16 have sealed, the source of pressurized water can be connected to the water supply pipe 26 to pump water into the testing zone 28. The water will flow into the lateral pipe 4 until the lateral pipe 4 has filled to the required level. The flow meter in the water supply pipe 26 monitors the rate or volume of water supplied. Once the lateral supply pipe 4 has been filled to the required level, an increase in the pressure in the testing zone 28 is detected by the pressure transducer 32. This signals to the microprocessor controlling the inlet valve that the lateral pipe 4 has filled. If water must be continually supplied to maintain the pressure in the testing zone 28, this will indicate the presence of a leak in the lateral pipe 4. The rate at which water must be supplied to maintain the pressure gives an indication of the size of the leak.

It will be appreciated that the apparatus 2 provides a convenient means of detecting the presence of leaks in pipes without the need to excavate. Moreover the use of two pairs of seals prevents positive results being obtained on the basis of the seals not sealing against the inner walls 36 of the pipe 6. Also, because the water is supplied through the apparatus 2, an access point to the lateral pipe 4 need not be found. Therefore sections of pipes with no surface access can be tested.

The apparatus 2 also has the advantage that it can be readily automated by connecting the pressure transducers 18, 20 and 32, and the flow meter in the water supply pipe 26 to a suitable computer. The computer can be programmed to record and display all results.

It will be understood that the apparatus 2 need not be used exclusively in drainage pipes but can be used in any piping system which is difficult to access. It will also be appreciated that the liquid that is used need not be water; water is merely preferred since it is freely available and inexpensive. However any suitable liquid can be used including proprietary compounds that rely on penetration of the ground around any leak in the testing zone in order to seal the leaks.

Numerous modifications and variations may be made to the embodiment described without departing from the scope of the invention. For example the pressure transducers 18, 20 and 32, may be replaced by any suitable pressure sensing means. Alternatively the pressure sensing means 18 and 20 can be done away with all together by providing a visual leakage detection means. The visual leakage detection means may be a tube extending from between the first seal 10 and the second seal 12 and another tube extending from between the third seal 16 and the fourth seal 14 to a point that can be viewed by the closed circuit television camera. In this way any liquid flowing between the seals will be transported to a position where it can be viewed by the closed circuit television camera. Also, more than four seals can be used.

What is claimed is:

1. An apparatus suitable for detecting leaks in pipe systems, the apparatus comprising: an elongate body;

a first pair of inflatable seals adjacent one end of the body and a second pair of inflatable seals adjacent the opposite end of the body to define a testing zone between the first and second pairs of seals, the seals of each pair being spaced one from the other along the length of the body, the seals being substantially external to the body, and the seals when inflated being capable of sealingly engaging the inner walls of a pipe to be tested;

inflation means to inflate the seals by the introduction of fluid to the interior of the seals;

liquid supply means to supply a liquid to the testing zone;

a sealing leak detection means between the seals of each pair to detect incomplete sealing between the seals and the inner wall of the pipe, when they are inflated; and a level sensing means within the testing zone to detect changes in liquid level in the testing zone.

2. An apparatus according to claim 1 in which the sealing leak detection means comprises a pressure sensing means to sense pressure between the seals when they are inflated.

3. An apparatus according to claim 1 in which the level sensing means comprises a pressure sensing means to sense pressure in the testing zone.

4. An apparatus according to claim 2 in which the level sensing means comprises a pressure sensing means to sense pressure in the testing zone.

5. An apparatus according to claim 2 in which the pressure sensing means is capable of providing an electrical signal that can be converted to a digital or analog reading.

6. An apparatus according to claim 3 in which the pressure sensing means is capable of providing an electrical signal that can be converted to a digital or analog reading.

7. An apparatus according to claim 5 in which the pressure sensing means is a pressure transducer.

8. An apparatus according to claim 6 in which the pressure sensing means is a pressure transducer.

9. An apparatus according to claim 1 in which the liquid supply means includes a flow meter that provides an electrical signal that can be converted to a digital or analog reading.

10. An apparatus according to claim 1 further comprising a microprocessor that has storage means, computing means and display means, the micro-processor being connected to the sealing leak detection means and the level detection means to display information concerning the presence or absence of a leak between the seals and the level of liquid in the testing zone.

11. An apparatus according to claim 1 further comprising a closed circuit television camera positioned at either end of the body to assist in correct positioning of the apparatus over the section of the pipe to be tested.

12. A method for detecting the presence of a leak in a pipe system, the method comprising:

(a) positioning an apparatus according to claim 1 in a section of the pipe system to be tested;

(b) inflating the seals of the apparatus;

(c) monitoring the sealing leak detection means and, if a leak is detected, repositioning the apparatus in the pipe system and repeating the process from step (a);

(d) supplying liquid to the testing zone through the apparatus until the section to be tested is filled; and (e) determining whether or not a leak in the testing zone is present by monitoring whether or not liquid must be supplied to keep the section full.

13. A method for detecting the presence of a leak in a pipe system as in claim 12, the method further comprising cleaning a section of the pipe system where the apparatus is to be positioned and positioning the apparatus therein according to claim 1.

* * * * *

UNITED STATES PATENT AND TRADEMARK OFFICE
CERTIFICATE OF CORRECTION

PATENT NO. : 5,495,750
DATED : March 5, 1996
INVENTOR(S) : A.K. Dufresne

It is certified that error appears in the above-indentified patent and that said Letters Patent is hereby corrected as shown below:

| COLUMN | LINE | |
|---|---|---|
| 1 | 54 | "witch" should read --with-- |
| 5 | 26 | After "32" delete --,-- |
| 5 (Claim 1, | 40 line 2) | "an elongate body;" should be moved from the preamble to its own line to clarify that it is a separate element of the patented combination |

Signed and Sealed this

Sixteenth Day of July, 1996

Attest:

BRUCE LEHMAN

*Attesting Officer*        *Commissioner of Patents and Trademarks*